(12) United States Patent
Gao et al.

(10) Patent No.: US 12,063,138 B2
(45) Date of Patent: Aug. 13, 2024

(54) PROBABILISTIC SHAPING QAM DYNAMIC EQUALIZATION AND DIGITAL SIGNAL PROCESSING METHOD

(71) Applicant: SOOCHOW UNIVERSITY, Suzhou (CN)

(72) Inventors: Mingyi Gao, Suzhou (CN); Fengchu Cao, Suzhou (CN); Pengfei Wang, Suzhou (CN); Xiaodi You, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/196,209

(22) Filed: May 11, 2023

(65) Prior Publication Data

US 2023/0291633 A1 Sep. 14, 2023

Related U.S. Application Data

(63) Continuation of application No. PCT/CN2022/111777, filed on Aug. 11, 2022.

(30) Foreign Application Priority Data

Feb. 22, 2022 (CN) .......................... 202210172985.0

(51) Int. Cl.
*H04L 27/34* (2006.01)
*H04L 27/00* (2006.01)
*H04L 27/36* (2006.01)

(52) U.S. Cl.
CPC ........ *H04L 27/363* (2013.01); *H04L 27/3422* (2013.01); *H04L 27/3494* (2013.01); *H04L 2027/0036* (2013.01)

(58) Field of Classification Search
CPC ............. H04L 27/363; H04L 27/3422; H04L 27/3494; H04L 2027/0036; H04L 25/03;
(Continued)

(56) References Cited

U.S. PATENT DOCUMENTS

| | | | |
|---|---|---|---|
| 2014/0003546 A1 | 1/2014 | Rosenhouse | |
| 2018/0269983 A1* | 9/2018 | Karar | ...................... H04J 14/06 |
| 2020/0162172 A1* | 5/2020 | Sridhar | ................... H04L 27/12 |

FOREIGN PATENT DOCUMENTS

| | | | | |
|---|---|---|---|---|
| CA | 2919830 A1 * | 1/2015 | ........... | H04L 1/0001 |
| CN | 108667523 A * | 10/2018 | ........... | H04B 10/616 |

(Continued)

OTHER PUBLICATIONS

Cheng Wang et al., "Dual-Mode Blind Equalization Algorithm Based on Clustering" Signal Processing, vol. 28, No. 8, Aug. 2012, pp. 1194-1199 (Aug. 31, 2012).

*Primary Examiner* — Tanmay K Shah
(74) *Attorney, Agent, or Firm* — SZDC Law PC (57) ABSTRACT

Probabilistic shaping quadrature amplitude modulation (QAM) based on Maxwell-Boltzmann distribution is particularly important in coherent optical communication, which can approach the Shannon limit more desirably in the case of a finite signal-to-noise ratio. However, standard coherent optical digital signal processing algorithms are not optimal for demodulation of PS higher-order QAM signals. The invention provides a probabilistic shaping QAM dynamic equalization method that intercepts multiple inner rings after clock recovery and updates the convergence radius and area of a conventional blind dynamic channel equalization algorithm using a peak density K-means clustering algorithm. The clustering algorithm gives centroid labels and a quantity of classifications required for K-means, which does not require a large number of iterations of K-means, thereby reducing the complexity and improving (Continued)

the accuracy. The updated decision area and decision radius reduce errors in the dynamic equalization algorithm, thereby improving the accuracy of probabilistic shaping QAM digital signal processing.

10 Claims, 4 Drawing Sheets

(58) Field of Classification Search
CPC . H04L 27/01; H04L 27/3455; H04L 27/3477; H04L 27/3836; H04B 10/612; H04B 10/616; G06F 18/2321; G06F 18/23213
USPC .......................................................... 375/298
See application file for complete search history.

(56) References Cited

FOREIGN PATENT DOCUMENTS

| | | | | | |
|---|---|---|---|---|---|
| CN | 108965178 | A | | 12/2018 | |
| CN | 112350814 | A * | 2/2021 | ........... H04L 5/0016 |
| CN | 112528025 | A | | 3/2021 | |
| CN | 113344019 | A | | 9/2021 | |
| CN | 114500200 | A | | 5/2022 | |
| CN | 113537061 | B * | 3/2024 | ........... G06F 18/214 |
| EP | 1030490 | A2 * | 8/2000 | ........... H04L 5/0046 |

* cited by examiner

PROBABILISTIC SHAPING QAM DYNAMIC EQUALIZATION AND DIGITAL SIGNAL PROCESSING METHOD

This application is a Continuation Application of PCT/CN2022/111777, filed on PCT/CN2022/111777, which claims priority to Chinese Patent Application No. 202210172985.0, filed on Feb. 22, 2022, which is incorporated by reference for all purposes as if fully set forth herein.

FIELD OF THE INVENTION

The present invention relates to the field of communication technologies, and in particular to a probabilistic shaping quadrature amplitude modulation (QAM) dynamic equalization method, device, and apparatus, a computer storage medium, and a probabilistic shaping QAM digital signal processing method.

DESCRIPTION OF THE RELATED ART

Upgrades of digital coherent transceivers and the use of complex modulation formats are further driving the growth of fiber optic communications. In particular, the demand for data center load capacity is increasing and intensity modulated direct detection (IM/DD) is about to face a bottleneck. High-capacity, high-spectrum transmission between data centers is driving the development of higher-order QAM coherent optical communications. Recently, the advent of probabilistic shaping has brought innovation to coherent optical communications, bringing a transmission system closer to the Shannon limit and further driving ultra-high-order QAM and long-distance transmission for coherent optical communications. The complexity of the system inevitably places higher demands on digital signal processing (DSP). For standard uniform QAM signals, DSP algorithms are well established. However, DSP for signals with probabilistic shaping (PS) constellations requires further optimization.

The sensitivity of conventional Gardner timing error detection (G-TED) is strongly affected by the PS amplitude and pulse roll-off factor, and the improved G-TED algorithm can greatly balance this problem. Two new blind frequency offset estimation (FOE) algorithms are proposed for more accurate blind estimation of frequency offsets in PS-MQAM coherent optical communication systems, namely, the radius directed-4th order algorithm and the generalized circular harmonic expansion algorithm. Supervised phase search (SPS) is proposed to solve the problem that blind phase search (BPS) algorithms perform sub-optimally in PS systems, and the method performs mean square error estimation in the first stage to obtain a noise rejection window to mitigate this problem. In the case of strong shaping as well as non-optimal optical signal-to-noise ratio (OSNR), the determination of a signal radius and area is very different from that of uniform QAM signals. Strong shaping and non-optimal OSNR have an impact on the signal amplitude radius, while non-data-assisted dynamic channel equalization algorithms for higher-order QAM signals, such as a cascaded multi-mode algorithm (CMMA) and a radius-directed equalizer (RDE), are also affected by non-uniform amplitude distribution. CMMA reduces the error by cascading a reference radius and is relatively unaffected by a determination area. However, the determination area of RDE depends on (Rk-1+Rk)/2, and then a standard ring is determined based on a Euclidean distance, which shows that the performance of a dynamic equalization algorithm depends heavily on symbol radius and area selection. Therefore, how to reduce the impact of strong shaping and non-optimal OSNR on dynamic equalization and therefore further optimize the DSP accuracy of signals for probabilistic shaping (PS) constellations is the current problem to be solved.

SUMMARY OF THE INVENTION

For this, a technical problem to be resolved by the present invention is to overcome the problem of low accuracy of digital signal processing due to the impact of strong shaping and non-optimal OSNR on dynamic equalization in the prior art.

A probabilistic shaping QAM dynamic equalization method provided in the present invention includes:
intercepting n inner rings after clock recovery from a received QAM transmission signal;
converting the n inner rings from a two-dimensional rectangular coordinate system into a polar coordinate system, to obtain a polar coordinate constellation diagram;
calculating a local density of each data point in the polar coordinate constellation diagram;
calculating relative distances between each data point and a plurality of data points with a local density greater than the local density of the data point, and acquiring a minimum distance corresponding to each data point;
generating a decision diagram according to the minimum distance corresponding to each data point, and screening outliers according to the decision diagram, to obtain n cluster centers;
classifying the data points according to the n cluster centers by using a K-means algorithm, to obtain a K-means cluster graph;
averaging a maximum value of local densities of an $n^{th}$ cluster of clustering data points and a minimum value of local densities of an $(n-1)^{th}$ cluster of clustering data points, to obtain a decision radius and a decision area; and
introducing the decision radius and the decision area into a cascaded multi-mode algorithm equalizer and a radius-directed equalizer to perform dynamic equalization.

Preferably, the intercepting n inner rings after clock recovery from a received QAM transmission signal includes:
acquiring the transmission signal to perform resampling, matching filtering, and I/Q orthogonalization;
performing dispersion compensation on the transmission signal after I/Q orthogonalization from frequency domain, and performing the clock recovery by using a timing error detection algorithm and auxiliary symbols; and
intercepting the n inner rings of the transmission signal after the clock recovery.

Preferably, the converting the n inner rings from a two-dimensional rectangular coordinate system into a polar coordinate system, to obtain a polar coordinate constellation diagram includes:
dividing the polar coordinate constellation diagram into appropriate intervals, and superimposing data points in adjacent intervals, to obtain a high-density polar coordinate constellation diagram.

Preferably, the local density $\rho_i = \Sigma_{j \neq i} e^{-(dist_{ij}/D_c)^2}$ of each data point $X=[X_1, X_2, \ldots, X_N]$ in the polar coordinate constellation diagram is calculated, where N represents a total quantity of data symbols, i, j ∈N, $dist_{i,j}$ is a distance between a point $X_i$ and a point $X_j$ and $D_c$ is a cutoff distance.

Preferably, the calculating relative distances between each data point and a plurality of data points with a local density greater than the local density of the data point, and acquiring a minimum distance corresponding to each data point includes:

arranging the local densities of the data points in descending order;

calculating the minimum distance $\delta_i = \min_{j=1:i-1}(dist_{i,j})$ between the point $X_i$ and a plurality of data points with a local density greater than the local density of the point; and setting the minimum distance of a point $X_i$ with a highest local density to a maximum distance $\delta_i = \max_{j=2:N}(dist_{i,j})$ between the data point $X_i$ and other data points.

Preferably, the classifying the data points according to the n cluster centers by using a K-means algorithm, to obtain a K-means cluster graph includes: calculating distances between each data point and the n cluster centers, and classifying the data point into a class corresponding to a cluster center with a smallest distance.

The present invention further provides a probabilistic shaping QAM digital signal processing method, including the foregoing probabilistic shaping QAM dynamic equalization method.

The present invention further provides a probabilistic shaping QAM dynamic equalization apparatus, including:

an inner-ring interception module, configured to intercept n inner rings after clock recovery from a received QAM transmission signal;

a polar coordinate conversion module, configured to convert the n inner rings from a two-dimensional rectangular coordinate system into a polar coordinate system, to obtain a polar coordinate constellation diagram;

a local density calculation module, configured to calculate a local density of each data point in the polar coordinate constellation diagram;

a minimum distance calculation module, configured to calculate relative distances between each data point and a plurality of data points with a local density greater than the local density of the data point, and acquire a minimum distance corresponding to each data point;

a cluster center determination module, configured to generate a decision diagram according to the minimum distance corresponding to each data point, and screen outliers according to the decision diagram, to obtain n cluster centers;

a clustering module, configured to classify the data points according to the n cluster centers by using a K-means algorithm, to obtain a K-means cluster graph;

a decision area determination module, configured to average a maximum value of local densities of an $n^{th}$ cluster of clustering data points and a minimum value of local densities of an $(n-1)^{th}$ cluster of clustering data points, to obtain a decision radius and a decision area; and a dynamic equalization module, configured to introduce the decision radius and the decision area into a cascaded multi-mode algorithm equalizer and a radius-directed equalizer to perform dynamic equalization.

The present invention further provides a probabilistic shaping QAM dynamic equalization device, including:

a memory, configured to store a computer program; and a processor, configured to execute the computer program to implement the steps of the foregoing probabilistic shaping QAM dynamic equalization method.

The present invention further provides a computer-readable storage medium, a computer program is stored on the computer-readable storage medium, the computer program is executed by a processor to implement the foregoing probabilistic shaping QAM dynamic equalization method.

Compared with the prior art, the foregoing technical solution of the present invention has the following advantages:

Multiple inner rings after clock recovery are intercepted in the probabilistic shaping QAM dynamic equalization method described in the present invention, and a radius difference of a QAM inner ring is usually larger than that of an outer ring. Therefore, multiple inner rings may be selected for error feedback to reduce the complexity and improve the accuracy, and the robustness of convergence can be improved at the same time. The convergence radius and area of a conventional blind dynamic channel equalization algorithm are updated using a peak density K-means clustering algorithm. In a conventional K-means algorithm, clustering results are very sensitive to the selection of an initial centroid, and a probability of finding an appropriate initial centroid randomly is particularly low. In addition, as the number of centroids increases, the algorithm tends to fall into a local optimization dilemma. This is because a criterion function in the K-means algorithm is a nonconvex squared error estimation function, which tends to make the algorithm deviate from a search range of a global optimal solution. The peak density clustering algorithm gives centroid labels and a quantity of classifications required for K-means, and therefore does not require a large number of iterations of K-means, thereby reducing the overall complexity and improving the accuracy. The updated decision area and decision radius reduce errors in the dynamic equalization algorithm, thereby further improving the accuracy of medium probabilistic shaping QAM digital signal processing.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The core of the present invention is to provide a probabilistic shaping QAM dynamic equalization method, device, and apparatus, a computer storage medium, and a probabilistic shaping QAM digital signal processing method, to resolve the problem of low accuracy of digital signal processing due to the impact of strong shaping and non-optimal OSNR on dynamic equalization.

To enable a person skilled in the art to better understand the solutions of the present invention, the present invention is further described below in detail with reference to the accompanying drawings and specific implementations. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
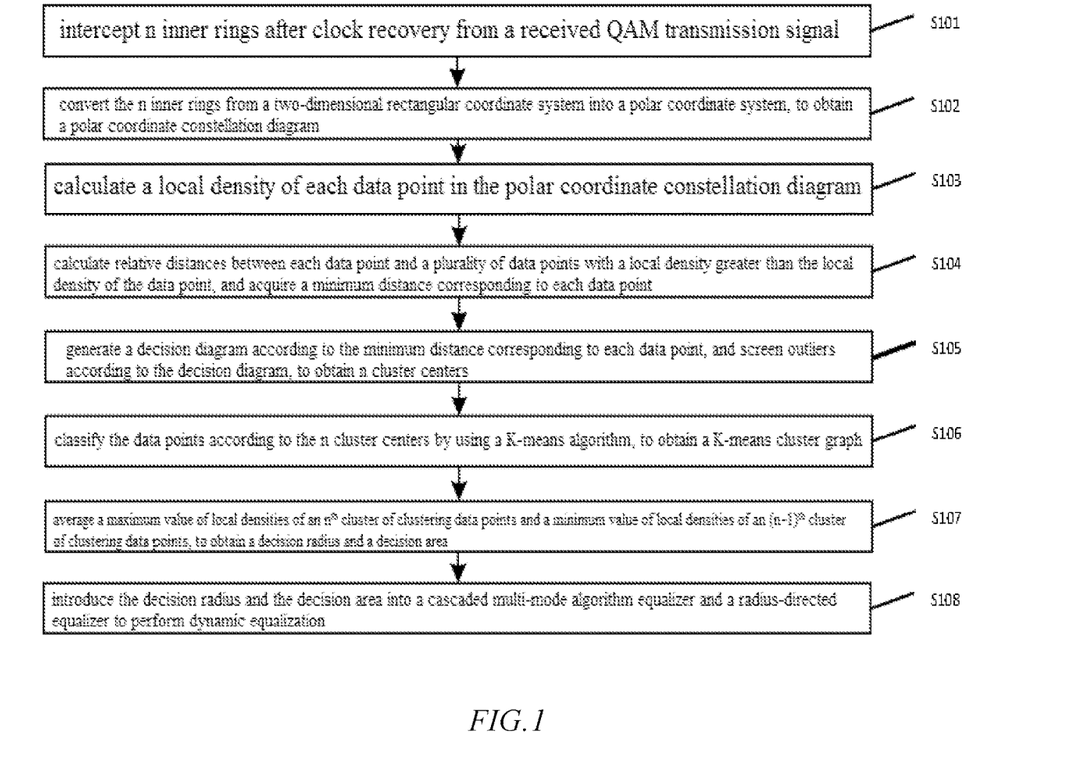
FIG. 1 is a flowchart of implementing a probabilistic shaping QAM dynamic equalization method according to the present invention.

Referring to FIG. 1, FIG. 1 is a flowchart of implementing a probabilistic shaping QAM dynamic equalization method according to the present invention.

Specific operation steps are as follows:

S101: Intercept n inner rings after clock recovery from a received QAM transmission signal;

acquire the transmission signal to perform resampling, matching filtering, and I/Q orthogonalization;

perform dispersion compensation on the transmission signal after I/Q orthogonalization from frequency domain, and perform the clock recovery by using a timing error detection algorithm and auxiliary symbols; and intercept the n inner rings of the transmission signal after the clock recovery.

Figure 2:
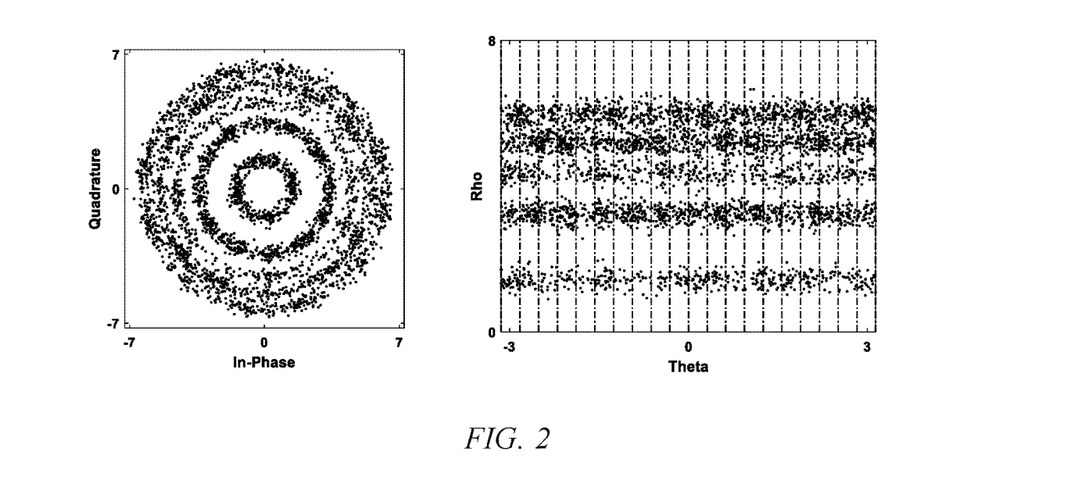
FIG. 2 is a schematic diagram of converting rectangular coordinates extracted from some inner rings into polar coordinates.

S102: As shown in FIG. 2, convert the n inner rings from a two-dimensional rectangular coordinate system into a polar coordinate system, to obtain a polar coordinate constellation diagram; and divide the polar coordinate constellation diagram into appropriate intervals, and superimpose data points in adjacent intervals, to obtain a high-density polar coordinate constellation diagram.

S103: Calculate a local density of each data point in the polar coordinate constellation diagram.

A cluster center of each cluster in a constellation diagram is always surrounded by points with a relatively low local density. Therefore, the cluster center has the largest local density in the cluster. A local density ρ of each point in the diagram is calculated by using a Gaussian kernel function, and may be represented as:

$$\rho_i = \Sigma_{j \neq i} e^{-(dist_{i,j}/D_c)^2}$$

where a data set is $X=[X_1, X_2, \ldots, X_N]$, N represents a total quantity of data symbols, $i, j \in N$, $dist_{i,j}$ is a distance between a point $X_i$ and a point $X_j$ and $D_c$ is a cutoff distance. If the $dist_{i,j}$ between two points is less than $D_c$, it is considered that the point $X_j$ is within a range of the point $X_i$. Therefore, it is vital to set the value of a partial range Dc in a clustering algorithm.

S104: Calculate relative distances between each data point and a plurality of data points with a local density greater than the local density of the data point, and acquire a minimum distance corresponding to each data point;

arrange the local densities of the data points in descending order;

calculate the minimum distance $\delta_i = \min_{j \neq 1:i-1}(dist_{i,j})$ between the point $X_i$ and a plurality of data points with a local density greater than the local density of the point; and set the minimum distance of a point $X_1$ with a highest local density to a maximum distance $\delta_i = \max_{j \neq 2:N}(dist_{i,j})$ between the data point $X_i$ and other data points.

S105: Generate a decision diagram according to the minimum distance corresponding to each data point, and screen outliers according to the decision diagram, to obtain n cluster centers.

Figure 3:
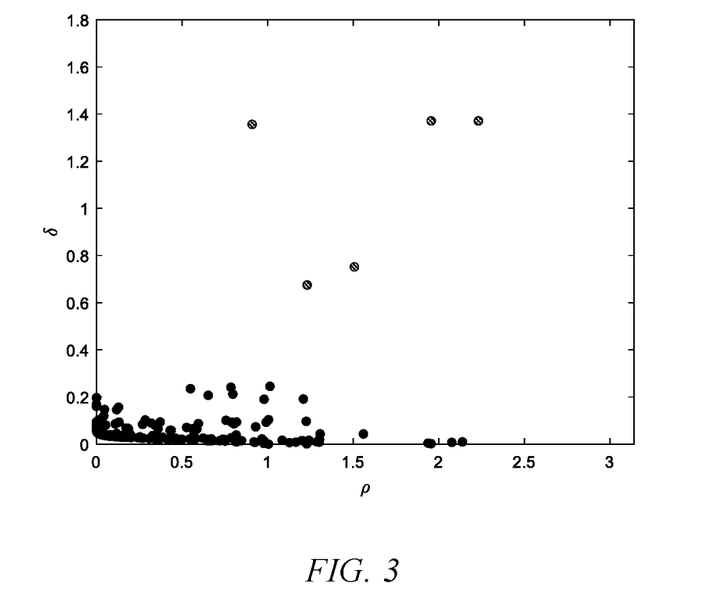
FIG. 3 is a decision diagram of a local density and a minimum distance.

Five points circled by dotted boxes in FIG. 3 represent clustering centers after five rings extracted in FIG. 2 are processed. In this way, the determination of a clustering quantity and the search for cluster centers are preliminarily completed. In addition, an approximate boundary of each cluster further needs to be determined. Because the clustering quantity and cluster centers are known, further optimization may be performed by using a K-means algorithm, to learn about boundary information.

S106: Classify the data points according to the n cluster centers by using a K-means algorithm, to obtain a K-means cluster graph; and calculate distances between each data point and the n cluster centers, and classify the data point into a class corresponding to a cluster center with a smallest distance.

S107: Average a maximum value of local densities of an $n^{th}$ cluster of clustering data points and a minimum value of local densities of an $(n-1)^{th}$ cluster of clustering data points, to obtain a decision radius and a decision area.

Figure 4:
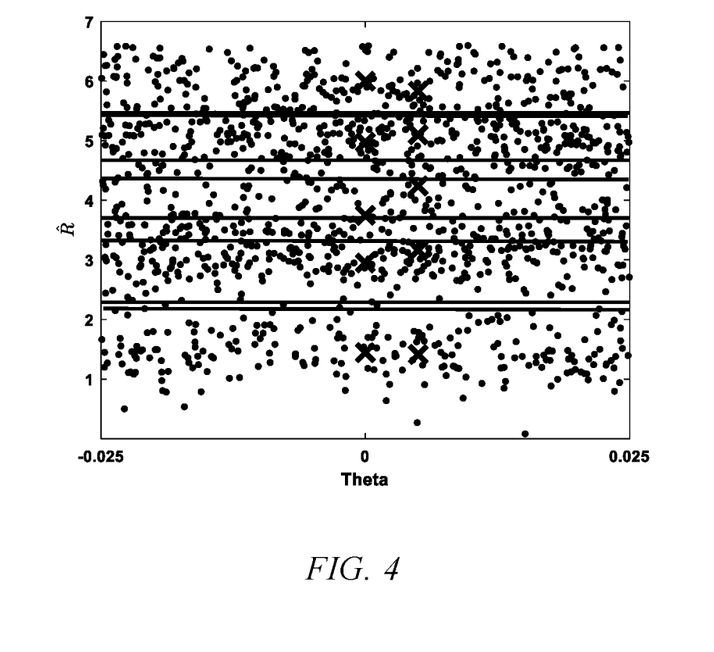
FIG. 4 is a K-means cluster graph.

A 7.4 bit/symbol 256-QAM signal with an OSNR of 26.36 dB is used as an example. FIG. 4 shows results of K-means clustering. An asterisk in the figure represents a theoretical radius value. A solid line represents a theoretical convergence area of RDE. A cross represents an updated radius value. A dotted line represents an updated convergence area. For each cluster of data, a maximum value and a minimum value are found. A minimum value of a former cluster and a maximum value of a latter cluster are averaged, and an obtained value is used as a final decision area, that is, the value of the dotted line. At this point, a new decision radius and a new decision area have been found.

S108: Introduce the decision radius and the decision area into a cascaded multi-mode algorithm equalizer and a radius-directed equalizer to perform dynamic equalization.

Multiple inner rings after clock recovery are intercepted in the probabilistic shaping QAM dynamic equalization method described in the present invention, and a radius difference of a QAM inner ring is usually larger than that of an outer ring. Therefore, multiple inner rings may be selected for error feedback to reduce the complexity and improve the accuracy, and the robustness of convergence can be improved at the same time. The inner rings are converted from a two-dimensional rectangular coordinate system into a polar coordinate system. For subsequent better clustering, data is superimposed according to appropriate intervals, and peak density clustering is performed. The convergence radius and area of a conventional blind dynamic channel equalization algorithm are updated using a peak density K-means clustering algorithm. In a conventional K-means algorithm, clustering results are very sensitive to the selection of an initial centroid, and a probability of finding an appropriate initial centroid randomly is particularly low. In addition, as the number of centroids increases, the algorithm tends to fall into a local optimization dilemma. This is because a criterion function in the K-means algorithm is a nonconvex squared error estimation function, which tends to make the algorithm deviate from a search range of a global optimal solution. The peak density clustering algorithm gives centroid labels and a quantity of classifications required for K-means, and therefore does not require a large number of iterations of K-means, thereby reducing the overall complexity and improving the accuracy. The updated decision area and decision radius reduce errors in the dynamic equalization algorithm, thereby further improving the accuracy of probabilistic shaping QAM digital signal processing.

Figure 5:
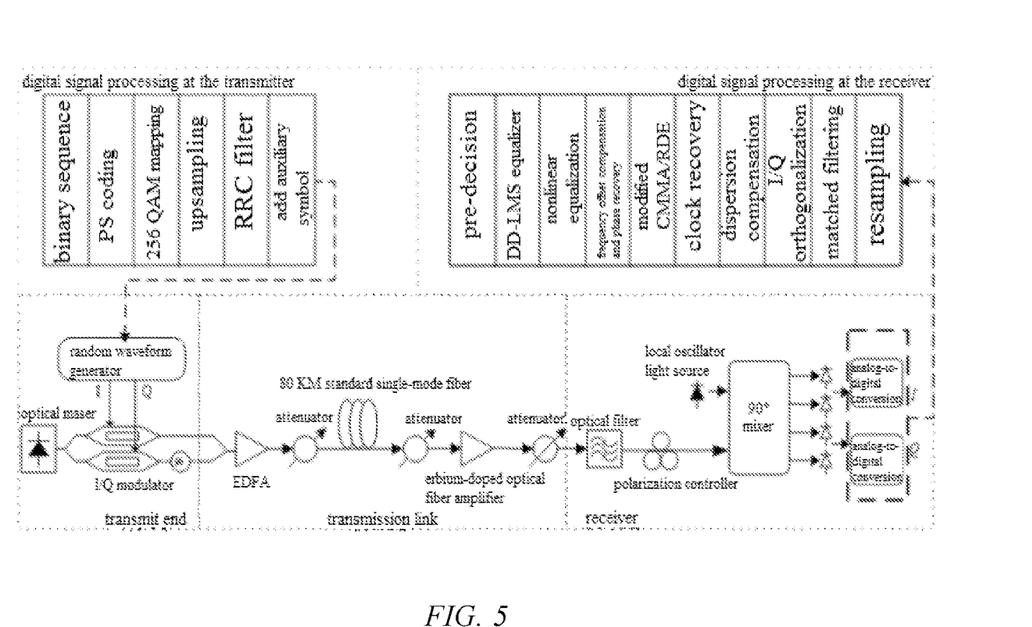
FIG. 5 is a flowchart of the test structure and DSP of a coherent communication system.

Based on the foregoing embodiments, it is verified in an experimental system in this embodiment that the method is effective for strong shaping and non-optimal OSNR QAM. Details are as follows:

FIG. 5 is a block diagram of an experimental apparatus of a coherent optical communication system and an offline DSP procedure of a transmitter and receiver of PS-256 QAM. At a transmit end, a pseudorandom binary sequence (PRBS-15) is first encoded by CCDM to implement conversion from bits into symbols. A non-uniform amplitude symbol is mapped into 16-level pulse amplitude modulation (PAM16). Next, a symbol sequence is upsampled into four samples per symbol, and the impact of intersymbol interference (ISI) is eliminated by using a root-raised-cosine (RRC) finite impulse response filter with a roll-off coefficient of 0.35. Finally, auxiliary symbols are added to the processed sequence, one part being used for assisting in clock timing, and the other part being used for frequency offset compensation. Two PAM16 sequences are imported into a random waveform generator to perform digital-to-analog conversion, and are modulated by a Mach-Zehnder modulator to generate a 256-QAM signal. The modulated QAM signal is transmitted by an 80-kilometer SSMF to a coherent light receiver. A second additional variable optical attenuator (VOA) is used to change an OSNR of the transmitted QAM signal. In the receiver, the transmitted signal is acquired by a 50GSa/s analog-to-digital converter. Next, offline DSP includes resampling, an RRC filter, and I/Q orthogonalization. Dispersion compensation is performed from frequency domain, and clock retiming is performed by using a G-TED algorithm and auxiliary symbols. In a dynamic equalization phase, channel equalization is performed by using the provided optimization algorithm and 33 filter taps. Next, accurate frequency offset correction is performed on data by using a Fourier transform-based frequency offset estimation algorithm, and then initial phase correction is performed by using 20 pilot symbols before carrier phase recovery is completed. In addition, to mitigate nonlinear distortion caused by optoelectronic devices, after the carrier phase recovery, a second-order Volterra sequence-based Volterra nonlinear equalization (VNLE) algorithm is performed. Finally, a 121-tap direct decision least mean square (DD-LMS) equalizer is used for compensating for residual damage.

Figure 6:
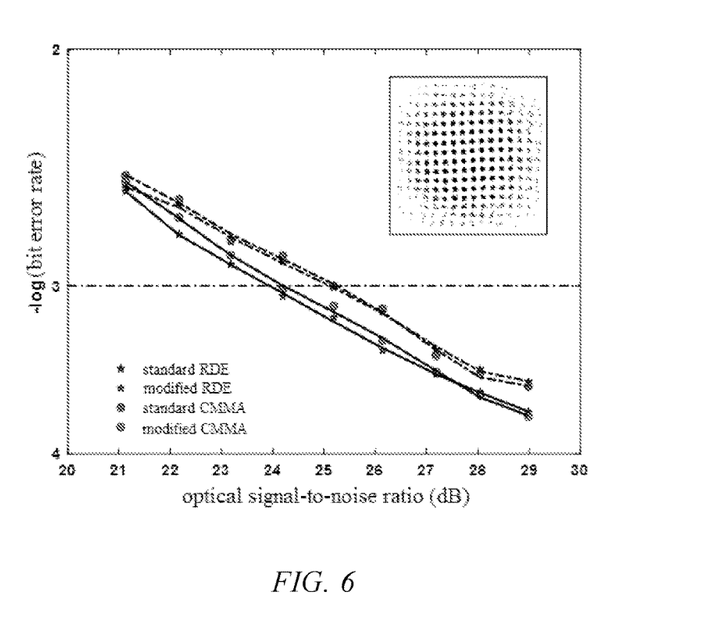
FIG. 6 is a schematic diagram of a bit error rate (BER) curve of a 7 bit/symbol 256-QAM signal after processing of standard CMMA (STD-CMMA), standard RDE (STD-RDE), modified CMMA, and modified RDE.
Figure 7:
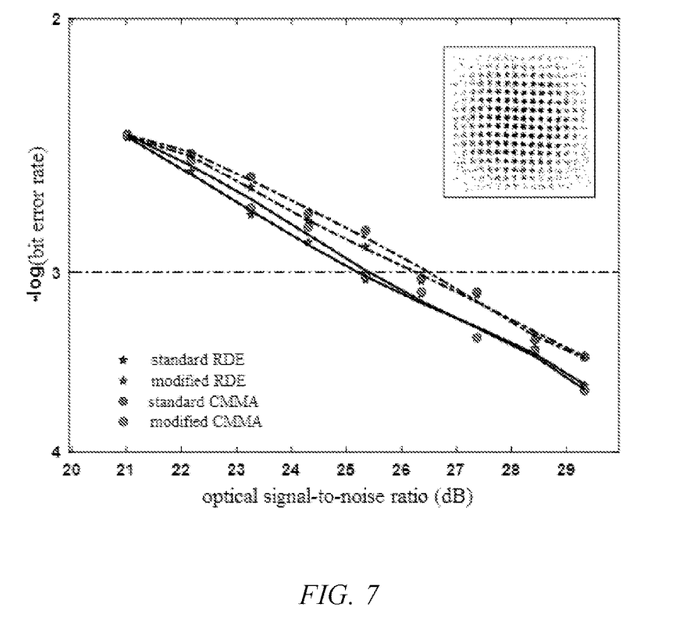
FIG. 7 is a schematic diagram of a bit error rate (BER) curve of a 7.4 bit/symbol 256-QAM signal after processing of standard CMMA (STD-CMMA), standard RDE (STD-RDE), modified CMMA, and modified RDE.

In this work, algorithm verification is performed on a strongly shaped 256-QAM signal. In this case, the impact of non-uniform amplitude distribution on the signal is obvious, the clock recovery effect is good, and recognition of inner rings is further facilitated. FIG. 6 and FIG. 7 show respectively bit error rate (BER) curves of a 7 bit/symbol 256-QAM signal and a 7.4 bit/symbol 256-QAM signal after processing of standard CMMA (STD-CMMA), standard RDE (STD-RDE), modified CMMA, and modified RDE. Constellation data in the figures are obtained through transmission over an 80-kilometer optical fiber, and the OSNR is 26.36 dB.

For a 7 bit/symbol 256-QAM signal, RDE has a gain of 1.3 described for the system under a threshold of $1 \times 10^{-3}$, and CMMA has a gain slightly higher than 1 dB. In a non-optimal OSNR case, the modified RDE shows slightly better performance than the modified CMMA. Because RDE has higher requirements in a determination area, correction has been made before. For a 7.4 bit/symbol signal, an improvement degree is smaller than that for the 7 bit/symbol signal, and the modified RDE and the modified CMMA may respectively obtain gains of 1 dB and 0.8 dB. As the OSNR of light decreases, the impact of noise on clock recovery performance keeps increasing. The curves approach at 21 dB. At this point, it is considered that the algorithm starts to fail.

In this work, the RDE and the CMMA are optimized. A peak density-based K-means algorithm is used. In the experimental system, it is successfully verified that the method is effective for strong shaping and non-optimal OSNR QAM. 7 and 7.4 bit/symbol 256-QAM signals are transmitted over a 80-km SSMF at a rate of 2 GBaud, and a gain above 1 dB may be implemented using a modified blind equalization algorithm.

Figure 8:
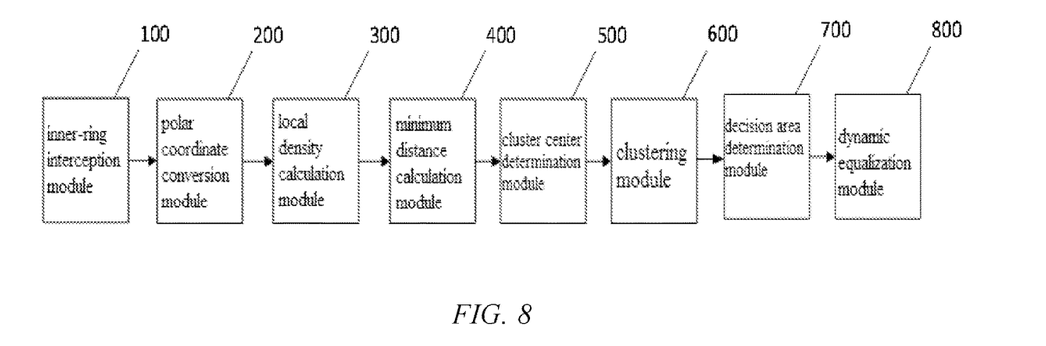
FIG. 8 is a structural block diagram of a probabilistic shaping QAM dynamic equalization apparatus according to an embodiment of the present invention.

Referring to FIG. 8, FIG. 8 is a structural block diagram of a probabilistic shaping QAM dynamic equalization apparatus according to an embodiment of the present invention. A specific apparatus may include:

an inner-ring interception module 100, configured to intercept n inner rings after clock recovery from a received QAM transmission signal;

a polar coordinate conversion module 200, configured to convert the n inner rings from a two-dimensional rectangular coordinate system into a polar coordinate system, to obtain a polar coordinate constellation diagram;

a local density calculation module 300, configured to calculate a local density of each data point in the polar coordinate constellation diagram;

a minimum distance calculation module 400, configured to calculate relative distances between each data point and a plurality of data points with a local density greater than the local density of the data point, and acquire a minimum distance corresponding to each data point;

a cluster center determination module 500, configured to generate a decision diagram according to the minimum distance corresponding to each data point, and screen outliers according to the decision diagram, to obtain n cluster centers;

a clustering module 600, configured to classify the data points according to the n cluster centers by using a K-means algorithm, to obtain a K-means cluster graph;

a decision area determination module 700, configured to average a maximum value of local densities of an $n^{th}$ cluster of clustering data points and a minimum value of local densities of an $(n-1)^{th}$ cluster of clustering data points, to obtain a decision radius and a decision area; and a dynamic equalization module 800, configured to introduce the decision radius and the decision area into a cascaded multi-mode algorithm equalizer and a radius-directed equalizer to perform dynamic equalization.

The probabilistic shaping QAM dynamic equalization apparatus in this embodiment is configured to implement the foregoing probabilistic shaping QAM dynamic equalization method. Therefore, for a specific implementation of the probabilistic shaping QAM dynamic equalization apparatus, reference may be made to the embodiment part of the foregoing probabilistic shaping QAM dynamic equalization method. For example, the inner-ring interception module 100, the polar coordinate conversion module 200, the local density calculation module 300, the minimum distance calculation module 400, the cluster center determination module 500, the clustering module 600, the decision area determination module 700, and the dynamic equalization module 800 are respectively configured to implement steps S101, S102, S103, S104, S105, S106, S107, and S108 in the foregoing probabilistic shaping QAM dynamic equalization method. Therefore, for the specific implementation of the apparatus, reference may be made to the descriptions in corresponding parts of embodiments. Details are not described again herein.

The present invention further provides a probabilistic shaping QAM digital signal processing method, including the foregoing probabilistic shaping QAM dynamic equalization method.

A specific embodiment of the present invention further provides a probabilistic shaping QAM dynamic equalization device, including: a memory, configured to store a computer program; and a processor, configured to execute the computer program to implement the steps of the foregoing probabilistic shaping QAM dynamic equalization method.

A specific embodiment of the present invention further provides a computer-readable storage medium, a computer program is stored on the computer-readable storage medium, the computer program is executed by a processor to implement the foregoing probabilistic shaping QAM dynamic equalization method.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A probabilistic shaping quadrature amplitude modulation (QAM) dynamic equalization method, comprising:

intercepting n inner rings after clock recovery from a received QAM transmission signal;

converting the n inner rings from a two-dimensional rectangular coordinate system into a polar coordinate system, to obtain a polar coordinate constellation diagram;

calculating a local density $\rho_i = \Sigma_{j \neq i} e^{-(dist_{i,j}/D_c)^2}$ of each data point $X=[X_1, X_2, \ldots, X_N]$ in the polar coordinate constellation diagram, wherein N represents a total quantity of data symbols, i, j $\in$ N, $dist_{i,j}$ is a distance between a point $X_i$ and a point $X_j$ and $D_c$ is a cutoff distance;

calculating relative distances between each data point and a plurality of data points with a local density greater than the local density of the each data point, and acquiring a minimum distance corresponding to each data point:

arranging the local densities of the data points in descending order;

calculating the minimum distance $\delta_i = \min_{j \neq 1:i-1}(dist_{i,j})$ between the point $X_i$ and a plurality of data points with a local density greater than the local density of the point $X_i$; and setting the minimum distance of a point $X_1$ with a highest local density to a maximum distance $\delta_i = \max_{j \neq 2:N}(dist_{i,j})$ between the data point $X_1$ and other data points;

generating a decision diagram according to the minimum distance corresponding to each data point, and screening outliers according to the decision diagram, to obtain n cluster centers;

classifying the data points according to the n cluster centers by using a K-means algorithm, to obtain a K-means cluster graph;

averaging a maximum value of local densities of an $n^{th}$ cluster of clustering data points and a minimum value of local densities of an $(n-1)^{th}$ cluster of clustering data points, to obtain a decision radius and a decision area; and introducing the decision radius and the decision area into a cascaded multi-mode algorithm equalizer and a radius-directed equalizer to perform dynamic equalization.

2. The probabilistic shaping QAM dynamic equalization method according to claim 1, wherein the intercepting n inner rings after clock recovery from a received QAM transmission signal comprises:

acquiring the transmission signal to perform resampling, matching filtering, and I/Q orthogonalization;

performing dispersion compensation on the transmission signal after I/Q orthogonalization from frequency domain, and performing the clock recovery by using a timing error detection algorithm and auxiliary symbols; and intercepting the n inner rings of the transmission signal after the clock recovery.

3. The probabilistic shaping QAM dynamic equalization method according to claim 1, wherein after the converting the n inner rings from a two-dimensional rectangular coordinate system into a polar coordinate system, to obtain a polar coordinate constellation diagram, the method comprises:

dividing the polar coordinate constellation diagram into appropriate intervals, and superimposing data points in adjacent intervals, to obtain a high-density polar coordinate constellation diagram.

4. The probabilistic shaping QAM dynamic equalization method according to claim 1, wherein the classifying the data points according to the n cluster centers by using a K-means algorithm, to obtain a K-means cluster graph comprises:

calculating distances between each data point and the n cluster centers, and classifying the data point into a class corresponding to a cluster center with a smallest distance.

5. The probabilistic shaping QAM dynamic equalization method according to claim 1, wherein the introducing the decision radius and the decision area into a cascaded multi-mode algorithm equalizer and a radius-directed equalizer to perform dynamic equalization comprises:

introducing the decision radius and the decision area into the cascaded multi-mode algorithm equalizer and the radius-directed equalizer, and performing channel equalization by using 33 filter taps.

6. The probabilistic shaping QAM dynamic equalization method according to claim 1, wherein after the introducing the decision radius and the decision area into a cascaded multi-mode algorithm equalizer and a radius-directed equalizer to perform dynamic equalization, the method further comprises:

performing accurate frequency offset correction on data by using a Fourier transform-based frequency offset estimation algorithm, performing initial phase correction by using 20 pilot symbols before carrier phase recovery is completed, and after the carrier phase recovery, performing second-order Volterra sequence-based Volterra nonlinear equalization.

7. The probabilistic shaping QAM dynamic equalization method according to claim 6, wherein the performing second-order Volterra sequence-based Volterra nonlinear equalization further comprises:

compensating for residual damage by using a 121-tap direct decision least mean square equalizer.

8. A probabilistic shaping quadrature amplitude modulation (QAM) dynamic equalization apparatus, comprising:

an inner-ring interception module, configured to intercept n inner rings after clock recovery from a received QAM transmission signal;

a polar coordinate conversion module, configured to convert the n inner rings from a two-dimensional rectangular coordinate system into a polar coordinate system, to obtain a polar coordinate constellation diagram;

a local density calculation module, configured to calculate a local density $\rho_i = \Sigma_{j \neq i} e^{-(dist_{i,j}/D_c)^2}$ of each data point $X = [X_1, X_2, \ldots, X_N]$ in the polar coordinate constellation diagram, wherein N represents a total quantity of data symbols, i, j $\in$ N, $dist_{i,j}$ is a distance between a point $X_i$ and a point $X_j$ and $D_c$ is a cutoff distance;

a minimum distance calculation module, configured to calculate relative distances between each data point and a plurality of data points with a local density greater than the local density of the each data point, and acquire a minimum distance corresponding to each data point:

arranging the local densities of the data points in descending order;

calculating the minimum distance $\delta_i = \min_{j \neq 1:i-1}(dist_{i,j})$ between the point $X_i$ and a plurality of data points with a local density greater than the local density of the point $X_i$; and setting the minimum distance of a point $X_1$ with a highest local density to a maximum distance $\delta_i = \max_{j \neq 2:N}(dist_{i,j})$ between the data point $X_1$ and other data points;

a cluster center determination module, configured to generate a decision diagram according to the minimum distance corresponding to each data point, and screen outliers according to the decision diagram, to obtain n cluster centers;

a clustering module, configured to classify the data points according to the n cluster centers by using a K-means algorithm, to obtain a K-means cluster graph;

a decision area determination module, configured to average a maximum value of local densities of an $n^{th}$ cluster of clustering data points and a minimum value of local densities of an $(n-1)^{th}$ cluster of clustering data points, to obtain a decision radius and a decision area; and a dynamic equalization module, configured to introduce the decision radius and the decision area into a cascaded multi-mode algorithm equalizer and a radius-directed equalizer to perform dynamic equalization.

9. A probabilistic shaping quadrature amplitude modulation (QAM) dynamic equalization device, comprising:

a memory, configured to store a computer program; and a processor, configured to execute the computer program to implement the steps of the probabilistic shaping QAM dynamic equalization method according to claim 1.

10. A non-transitory computer-readable storage medium, wherein a computer program is stored on the computer-readable storage medium, the computer program being executed by a processor to implement the steps of the probabilistic shaping quadrature amplitude modulation (QAM) dynamic equalization method according to claim 1.

* * * * *